US008799351B1

(12) United States Patent
Compton et al.

(10) Patent No.: US 8,799,351 B1
(45) Date of Patent: Aug. 5, 2014

(54) COMMUNICATING MULTIPLE FILES IN MARKUP LANGUAGE DOCUMENTS

(75) Inventors: William D. Compton, Huntington Beach, CA (US); David J. Trott, El Segundo, CA (US); Navin Goel, Torrance, CA (US); Randall Ehler, Culver City, CA (US)

(73) Assignee: Glovia International, Inc., El Segundo, CA (US)

( * ) Notice: Subject to any disclaimer, the term of this patent is extended or adjusted under 35 U.S.C. 154(b) by 3525 days.

(21) Appl. No.: 11/015,619

(22) Filed: Dec. 17, 2004

(51) Int. Cl.
*G06F 15/16* (2006.01)
*G06F 17/00* (2006.01)

(52) U.S. Cl.
USPC ........... 709/203; 715/234; 715/236; 715/237; 715/239

(58) Field of Classification Search
USPC .................................. 709/203; 715/234–239
See application file for complete search history.

(56) References Cited

U.S. PATENT DOCUMENTS

| 5,630,070 | A | 5/1997 | Dietrich et al. | 705/8 |
|---|---|---|---|---|
| 6,141,647 | A | 10/2000 | Meijer et al. | 705/1 |
| 6,615,092 | B2 | 9/2003 | Bickley et al. | 700/99 |
| 6,629,008 | B2 | 9/2003 | Shiiba et al. | 700/100 |
| 6,915,275 | B2 | 7/2005 | Banerjee et al. | 705/26 |
| 6,934,594 | B2 | 8/2005 | Loring et al. | 700/100 |
| 2001/0047365 | A1* | 11/2001 | Yonaitis | 707/200 |
| 2004/0117048 | A1 | 6/2004 | Wei | 700/100 |
| 2004/0117227 | A1 | 6/2004 | Wei | 705/7 |
| 2004/0148212 | A1 | 7/2004 | Wu et al. | 705/8 |
| 2006/0041840 | A1* | 2/2006 | Blair et al. | 715/513 |

OTHER PUBLICATIONS

Wacker, J.G., Lummus, R.R., "Sales Forecasting for Strategic Resource Planning," International Journal of Operations & Production Management 22, 9/10 (2002) 1014-1031.

* cited by examiner

*Primary Examiner* — Peling Shaw
(74) *Attorney, Agent, or Firm* — Baker Botts L.L.P.

(57) ABSTRACT

A communication system includes a number of devices interconnected by a communication network and each operable to communicate with each other using a text-based communication protocol that provides for the exchange of markup language documents. Each of the devices includes a document interface capable of generating, transmitting, receiving, and processing markup language documents including multiple files.

27 Claims, 3 Drawing Sheets

COMMUNICATING MULTIPLE FILES IN MARKUP LANGUAGE DOCUMENTS

TECHNICAL FIELD OF THE INVENTION

The present invention relates generally to markup language documents and, more particularly, to communicating multiple files in markup language documents.

BACKGROUND OF THE INVENTION

The introduction of the World-Wide-Web gave rise to the popularity of text-based communication formats, such as hypertext markup languages (HTML). A number of other markup languages have evolved to provide even greater functionality than was originally provided by HTML. For example, extensible markup language (XML) provides a generic framework for sophisticated text-based communications. With the rapid spread of these text-based communication protocols, additional technological challenges must constantly be identified and overcome.

SUMMARY OF THE INVENTION

In accordance with the present invention, techniques for communicating multiple files in markup language documents are provided.

According to a particular embodiment, a method for communicating multiple files in a single markup language document includes receiving electronic data for delivery to a destination address and generating a first markup language document including the electronic data. The method also includes receiving an electronic file associated with the electronic data and storing both the first markup language document and the electronic file in a payload of a second markup language document. The method also includes generating a header for the second markup language document, the header identifying the existence of both the first markup language document and the electronic file in the payload, and transmitting the second markup language document including the header and the payload to the destination address using a communication network.

Embodiments of the invention provide various technical advantages. According to particular embodiments, these techniques may eliminate or reduce inefficiencies and other problems associated with traditional communication systems. For example, these techniques can provide for communicating multiple files in a single markup language document. According to particular embodiments, these techniques can ensure proper receipt and processing of related information at receiving devices. For example, a sending device may identify to a remote device that multiple files are related by including the files in a single markup language document. Identification of multiple files as being related may ensure proper use of the files at the receiving device. Furthermore, including multiple files in a single markup language document may eliminate errors and delays associated with piecemeal communications. According to a particular embodiment, different types of files may be communicated in a single markup language document. By sending multiple types of files, these techniques may increase the likelihood that information communicated to the remote device may be utilized at the remote device. For example, these techniques may allow for communications with remote devices that can utilize only particular types of files.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
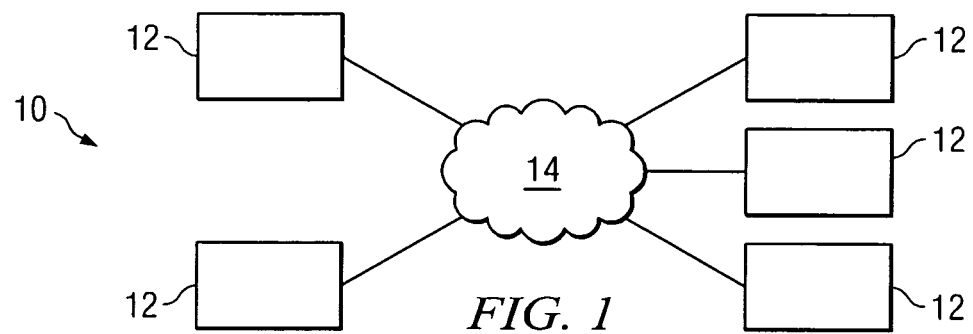
FIG. 1 is a system that includes a network interconnecting a number of devices each operable to communicate multiple files in markup language documents.

FIG. 1 illustrates a communication system, indicated generally at 10, that includes a number of devices 12 interconnected by a communications network 14. Applications operating on devices 12 communicate with each other through network 14 using text-based communication protocols that provide for the exchange of markup language documents. During communications, interfaces on devices 12 may transmit and receive markup language documents, including markup language documents containing multiple files. Each device may insert multiple files into a single markup language document and/or access multiple files included in a single markup language document.

For communications, network 14 provides for transport of documents between communicating devices 12. Network 14 represents any suitable collection and arrangement of components capable of interconnecting devices 12. For example, network 14 may encompass some or all of networks such as the Internet, the public switched telephone network (PSTN), and private networks.

Devices 12 represent hardware, including appropriate controlling logic, capable of processing information and interacting with other devices 12 using text-based communications. For example, devices 12 may represent one or more elements of a distributed enterprise system that perform business functions at various locations. Applications on devices 12 interact with each other by exchanging documents containing text-based communications. These documents may conform to any public or private standards designed for text-based communications. For example, these documents may be markup language documents conforming to HTML, XML, or other suitable public or private standards. Thus, markup language documents should be understood to encompass any suitable text-based communication conforming to a public or private text-based communication protocol.

Within devices 12, document interfaces provide for communication of multiple files in markup language documents. Before transmitting markup language documents, the document interfaces may provide for inclusion of multiple files in payloads of the markup language documents. The document interfaces may also provide for generation of headers for the markup language documents identifying the files in the payloads. After receiving markup language documents, the document interfaces may process headers to identify payloads including multiple files. The document interfaces may also access files included in payloads and process the files in various ways.

Files included in markup language documents may be of various types. For example, files included in markup language documents may conform to any of various formats such as portable document format (PDF), formats used for proprietary word processing or spreadsheet applications, or other suitable public or private formats. Alternatively or in addition, files included in markup language documents may conform to any public or private standards designed for text-based communications. For example, files included in markup language documents may themselves be markup language documents conforming to HTML, XML, or other suitable public or private standards.

Including multiple files in a single markup language document can help enable appropriate handling of the information in the files. Including multiple files in markup language documents may enable devices 12 to communicate information in a more efficient and useful manner. Furthermore, errors and delays associated with piecemeal communications may be avoided. For example, according to particular embodiments, related files may be communicated in a single markup language document. Including related files in one markup language document may ensure that all related information is received at a destination. Alternatively or in addition, according to particular embodiments similar information may be transmitted in various types of files included in a markup language document. By receiving various types of files, there is a better chance a receiving device 12 includes an application for processing at least one of the files.

It should be understood that while system 10 illustrates a relatively simple configuration of devices 12 interconnected by network 14, system 10 is provided merely for illustrative purposes. Thus, the disclosed concepts should be understood to encompass any suitable collection and arrangement of components in which endpoints transmit and receive markup language documents that may each include multiple files in a manner similar to that described herein.

Figure 2:
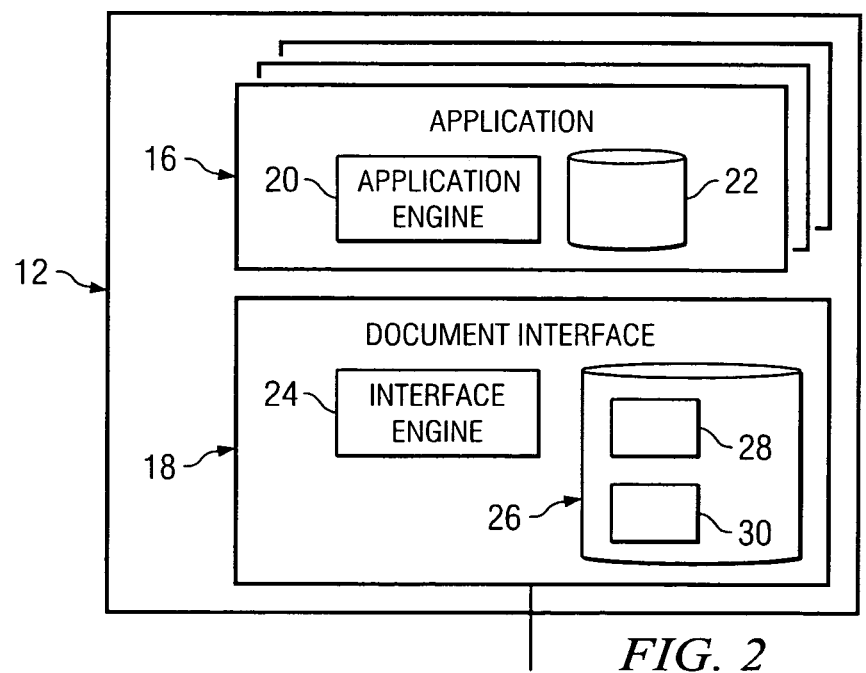
FIG. 2 is a block diagram illustrating exemplary functional elements for a device from the system.

FIG. 2 is a block diagram illustrating exemplary functional elements for a device 12 that includes one or more applications 16 and a document interface 18. Applications 16 provide processing and other high level functionality, and further communicate electronic data and/or files to document interface 18. Document interface 18 provides for transport of markup language documents communicated between devices 12. Document interface 18 further provides for generating, transmitting, receiving, and processing markup language documents, including markup language documents that contain multiple files.

Each application 16 includes software or other logic capable of generating electronic data and/or files for transmission to remote destinations. Furthermore, each application 16 includes software or other logic capable of processing received electronic data and/or files. For example, application 16 may be a business application for handling enterprise resource planning activities for a managed facility. Furthermore, selected applications 16 may be capable of communicating with other local or remote business applications on devices 12 using text-based communications. For example, selected applications 16 may be capable of utilizing XML. Conversely, one or more of applications 16 may not be able to communicate using XML or other text-based communications. Thus, applications 16 may include software programs. Alternatively or in addition, applications 16 may include local or remote devices such as facsimile machines or other devices.

In the embodiment illustrated, application 16 includes an application engine 20 for performing processing functions, and an application database 22 for maintaining data for use by application 16. For example, application database 22 may maintain application logic and business data used by application 16. Application database 22 may also include target rules for identifying file formats for particular remote destinations. According to particular embodiments, application 16 may generate electronic data and/or format electronic data into files for delivery to remote applications. Multiple files may be generated by each application 16. In addition, applications 16 may utilize different formats for files. For example, different applications 16 may utilize different file formats. Alternatively or in addition, one application 16 may be able to utilize different file formats, and may select particular file formats for particular remote destinations based on target rules in application database 22. Applications 16 may identify that any two or more files, as well as raw data, are related and/or intended for communication to the same remote destination. Also, applications 16 may perform operations on received electronic data and/or files.

Document interface 18 represents software or other logic for handling transmission and receipt of markup language documents. In addition, document interface 18 supports generation of markup language documents, including markup language documents containing multiple files. In the embodiment illustrated, document interface 18 includes an interface engine 24 for performing processing functions, and an interface database 26 for maintaining data used by document interface 18. Interface database 26 may store information for use in communicating markup language documents including multiple files. As illustrated, interface database 26 stores code 28 and buffer 30. Code 28 includes software or other appropriate logic routines for use in controlling the operation of document interface 18. Buffer 30 allows electronic data and files, including markup language documents, to be stored before being combined into a payload of a markup language document to be communicated to a remote destination.

In operation, an application 16 communicates electronic data and/or files to document interface 18 for transmission to remote destinations. Electronic data may be raw data generated by application 16. For example, electronic data may be binary data or any other form of raw data. Similarly, electronic files may be generated by application 16. Application 16 may generate various types of electronic files for delivery to remote applications. Each application 16 may only generate one type of electronic file. Alternatively, according to particular embodiments, application 16 may access target rules in application database 22 to identify formats associated with particular destinations. Application 16 may then format electronic data into electronic files according to identified formats. Formats may include PDF, HTML, XML, formats for proprietary word processing or spreadsheet applications, or other suitable public or private formats. Moreover, according to particular embodiments, application 16 may identify groups of related electronic data and/or files. Thus, application 16 provides the electronic data and/or files to document interface 18 for transmission. Application 16 may also communicate identifiers of destinations for the electronic data and/or files to document interface 18. In addition, application 16 may identify to document interface 18 that electronic data and/or files share a common intended destination.

The document interface 18 on the transmitting device 12 helps to handle processing of information to be communicated to a remote device 12. Document interface 18 may receive various types of information, including electronic data, destination addresses, and/or electronic files from applications 16 on the transmitting device 12. Upon receipt of information, document interface 18 may determine whether multiple electronic files should be included in the payload of a single markup language document. This determination may be based upon whether received information is related. For example, document interface 18 may identify that electronic data and/or files are to be communicated to the same destination address. Alternatively, document interface 18 may identify that electronic data and/or files are related in some other way.

When document interface 18 identifies that electronic data and/or files are related, or at any other appropriate time, document interface 18 may generate a wrapper markup language document including the identified electronic data and/or files. For example, one or more applications 16 may communicate electronic data and electronic files to document interface 18 along with the same destination address. By identifying the same destination address, document interface 18 may determine that the electronic data and the electronic file may be communicated in one wrapper markup language document.

To include the received electronic data in the wrapper markup language document, document interface 18 may generate a markup language document including received electronic data. Alternatively or in addition, for each electronic file identified as being associated with the electronic data, document interface 18 may store the related electronic files, including the generated markup language document, in the payload of the wrapper markup language document. Thus, each file to be communicated to the same destination address may be included in a single payload of the wrapper markup language document. If document interface 18 receives additional electronic data and/or files associated with the same destination address after creating the wrapper markup language document, files may be added to the payload of the wrapper markup language document.

After all files have been added to the payload of the wrapper markup language document, or at any other appropriate time, document interface 18 may generate a header for the wrapper markup language document. The header may identify the existence of multiple files in the payload. Furthermore, the header may identify information related to the files included in the payload. For example, the header may identify the format of the files and/or the types of applications 16 associated with the files. Alternatively or in addition, the header may identify the size of the files. The header may also identify relationships between files included in the payload.

According to a particular embodiment, the header may identify that a payload of a wrapper markup language document includes an embedded markup language document and a number of binary files. The embedded markup language document may have a special relationship with one or more of the binary files. For example, the embedded markup language document may be particularly related to the information in one of the binary files. In this or in similar circumstances, the embedded markup language document and/or the header of the wrapper markup language document may indicate the existence of or otherwise identify the related binary file. For example, the embedded markup language document may include a pointer to the related binary file. The pointer may be generated by document interface 18, for example, if document interface 18 generates the embedded markup language document. The pointer may reference a key stored by the wrapper markup language document that identifies the related binary file included in the payload. Thus, document interface 18 may include a key when generating the header or any other appropriate part of the wrapper markup language document. By using a pointer and a key, document interface 18 may avoid inefficiencies and other problems associated with embedding the binary file in the embedded markup language document. Furthermore, the pointer and the key may be used to identify particular data inside one or more of the included binary files.

Document interface 18 may transmit the wrapper markup language document, including the header and the payload, to a remote device 12. For example, document interface 18 may communicate the wrapper markup language document to a destination address received from application 16. Thus, document interface 18 may receive electronic data and/or files, include multiple files in a payload of a wrapper markup language document, generate a header for the wrapper markup language document, and communicate the payload and the header to a destination address associated with a remote device 12 in system 10.

The document interface 18 on the receiving device 12 helps to handle processing of information communicated from a remote device 12. Document interface 18 may receive an inbound markup language document including an inbound header and an inbound payload. Document interface 18 may process the header to identify whether the payload includes multiple files. For example, the header may identify that the markup language document includes another markup language document and/or other types of electronic files. Furthermore, the header may identify other relevant information such as sizes of files and/or formats and applications associated with the files. Based on this information, document interface 18 may access the files in the inbound payload. Furthermore, document interface 18 may process the files appropriately. For example, for a markup language document included in the inbound payload, document interface 18 may extract electronic data and process the extracted electronic data appropriately and/or forward the extracted electronic data to an appropriate application 16. Alternatively or in addition, document interface 18 may identify an appropriate application 16 for processing an inbound electronic file in the inbound payload. Document interface 18 may transmit accessed electronic files to appropriate applications 16. Thus, document interface 18 operates to receive inbound markup language documents and process inbound markup language documents appropriately to access and utilize included files.

According to a particular embodiment, the header may identify that a payload of an inbound wrapper markup language document includes an embedded markup language document and a number of binary files. Furthermore, the embedded markup language document and/or the header may identify that the embedded markup language document has a special relationship with one or more of the binary files. For example, the embedded markup language document may include a pointer to the related binary file. According to a particular embodiment, document interface 18 may analyze the pointer with reference to a key stored by the wrapper markup language document that identifies the related binary file included in the payload. After identifying the related files, document interface 18 may take appropriate actions. For example, document interface 18 may parse the embedded markup language document for instructions on how to process the related binary file. Alternatively or in addition, document interface 18 may communicate the embedded markup language document and the related binary file to a particularly identified application 16 for processing.

While the embodiment illustrated and the preceding description focus on a particular embodiment of device 12 that includes specific logical elements, system 10 contemplates devices 12 having any suitable combination and arrangement of elements that support communications using markup language documents that may include multiple files. Therefore, the modules and functionalities described may be separated or combined as appropriate, and some or all of the functionalities of device 12 may be performed by logic encoded in media, such as software and/or programmed logic devices. Furthermore, it should be noted that the embodiment illustrated and preceding description focus primarily on lower level transport functions without specifying in detail the higher level application functions provided by device 12. However, system 10 contemplates using the disclosed transport mechanisms to support any appropriate applications 16 operating within devices 12.

Figure 3:
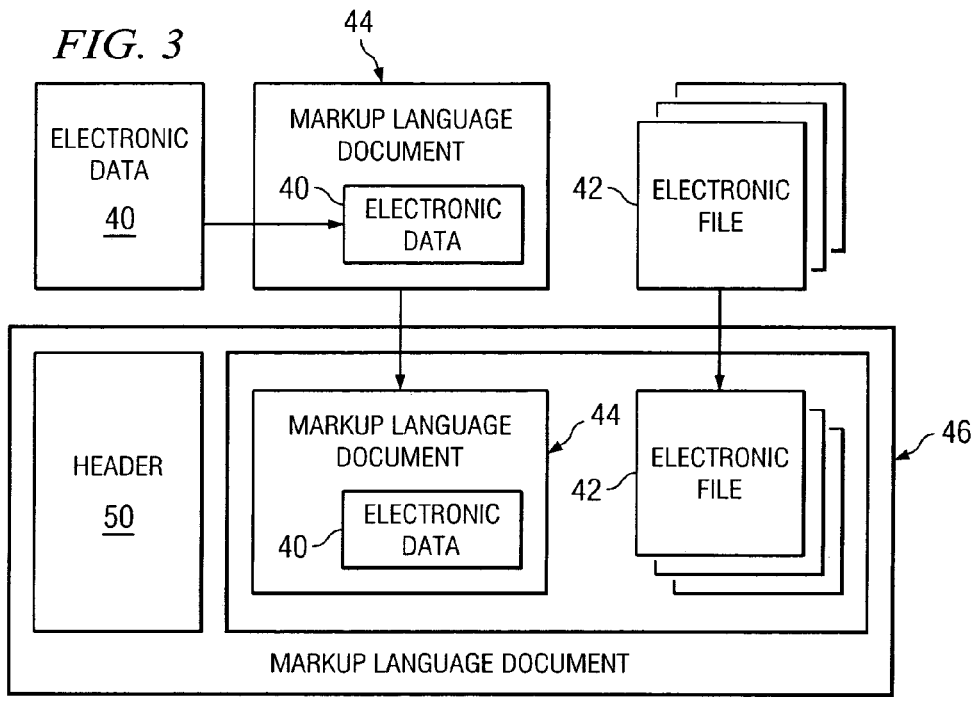
FIG. 3 is a block diagram illustrating including multiple files in a single markup language document.

FIG. 3 is a block diagram illustrating a particular example of including multiple files in a single markup language document. Electronic data 40 represents data communicated by one or more applications 16 to a local document interface 18. Electronic files 42 represent files communicated by one or more applications 16 to a local document interface 18. The files may be of various formats. For example, one or more of electronic files 42 may be a PDF file or any other appropriate formatted file. As illustrated, electronic data 40 may be included in markup language document 44. For example, after receiving electronic data 40, document interface 18 may include electronic data 40 in markup language document 44.

Electronic data 40, in its raw form or in the form of markup language document 44, and one or more of electronic files 42 may be related for various reasons. For example, electronic data 40 and one or more of electronic files 42 may be related because they share a common intended destination. However, electronic data 40 and electronic files 42 may be related for various other reasons such as sharing a common purpose or usefulness at a destination device 12. According to the example illustrated, document interface 18 identifies that electronic data 40 and electronic files 42 are related. For example, document interface 18 may determine that electronic data 40 and one or more electronic files 42 share a common destination address. In response to a determination that electronic data 40 and electronic files 42 are related, document interface 18 determines to communicate multiple files in a single markup language document 46.

Markup language document 46 includes a payload 48 and a header 50. Document interface 18 can insert electronic data 40, in its raw form or in the form of markup language document 44, along with electronic files 44 into payload 48 of markup language document 46. As illustrated, payload 48 includes markup language document 44 and electronic files 42. Thus, document interface 18 may include multiple files in payload 48. After multiple files have been included in payload 48, document interface 18 may update header 50 to identify the existence of multiple files in payload 48. Furthermore, document interface 18 may identify information related to each file, such as information identifying applications 16 and/or formats associated with the files.

Document interface 18 can communicate markup language document 46 to the destination address. For example, markup language document 46 may be communicated through network 14 to a remote device 12.

Thus, multiple electronic files may be received, generated, and inserted into payloads of markup language documents. Headers may also be generated to identify the existence of multiple files included in payloads of markup language documents. By communicating the headers and payloads to remote devices, multiple files may be communicated in a single markup language document.

Figure 4:
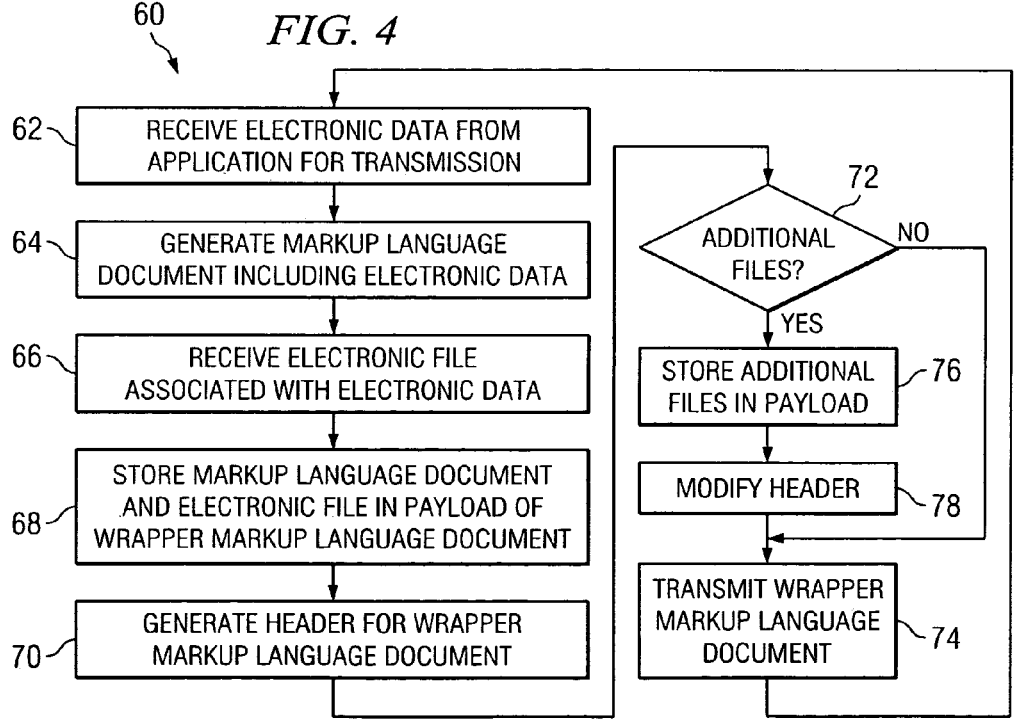
FIG. 4 is a flowchart illustrating an exemplary method for including multiple files in markup language documents.

FIG. 4 is a flowchart illustrating a method 60 for communicating multiple files in markup language documents. The following description will focus on the operation of document interface 18, however, it should be understood that similar techniques may be performed by any suitable elements to provide for generation and communication of markup language documents including multiple files.

Document interface 18 receives electronic data from an application 16 for transmission to a remote destination at step 62. Document interface 18 generates a markup language document including the electronic data at step 64. At step 66, document interface 18 receives an electronic file associated with the electronic data. Document interface 18 may identify that the electronic file and the electronic data are related, for example, by identifying a common destination address.

In response to receiving the related file, document interface 18 stores the generated markup language document and the received electronic file in a payload of a wrapper markup language document at step 68. Document interface 18 generates a header for the wrapper markup language document at step 70. For example, the header may identify the number and types of included files in the payload of the wrapper markup language document.

Document interface 18 determines whether to include additional files in the wrapper markup language document at step 72. If document interface 18 determines not to include additional files in the wrapper markup language document, document interface 18 transmits the wrapper markup language document to a destination address at step 74 before returning to step 62. Alternatively, if document interface 18 determines to include additional files in the wrapper markup language document, document interface 18 stores the additional files in the payload of the wrapper markup language document at step 76. Furthermore, document interface 18 modifies the header associated with the wrapper markup language document to identify the additional files included in the payload at step 78. Document interface 18 transmits the wrapper markup language document to the destination address at step 74 before returning to step 62.

Thus, method 60 illustrates an example of generating markup language documents that each may include multiple files for transmission through system 10. However, this flowchart illustrates only an exemplary method of operation, and system 10 contemplates document interface 18 using any suitable techniques, elements, and applications for performing similar tasks. Thus, many of the steps in this flowchart may take place simultaneously and/or in different orders than as shown. In addition, document interface 18 may use methods with additional steps, fewer steps, and/or different steps, so long as the methods remain appropriate.

Figure 5:
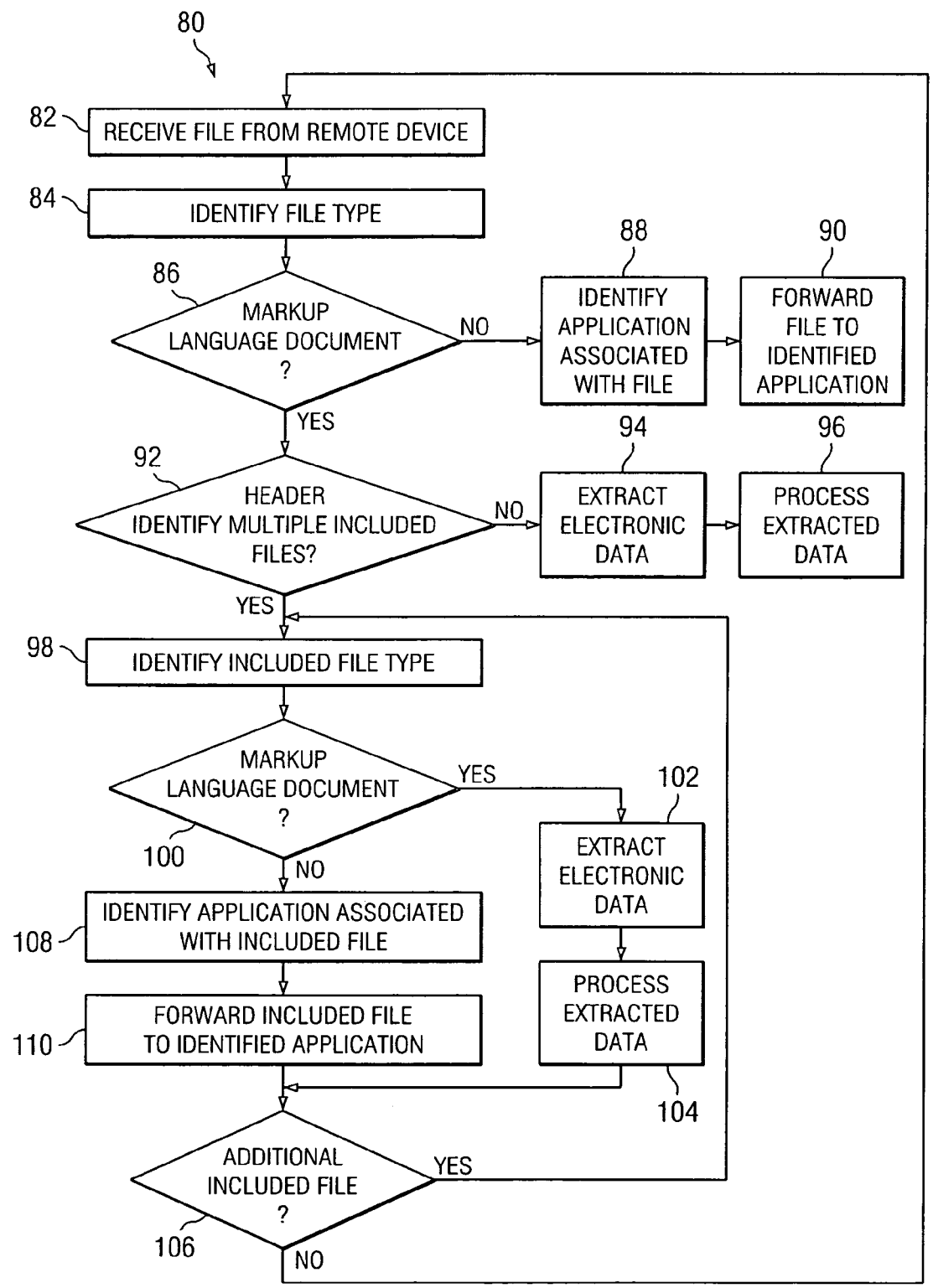
FIG. 5 is a flowchart illustrating an exemplary method for handling receipt of markup language documents including multiple files.

FIG. 5 is a flowchart illustrating a method 80 for receiving and processing markup language documents, including markup language documents containing multiple files. The following description will focus on the operation of document interface 18, however, it should be understood that similar techniques may be performed by any suitable elements to provide for receiving and processing markup language documents.

Document interface 18 receives a file from a remote device 12 at step 82. Document interface 18 identifies the type of the file at step 84. Based on this identification, document interface 18 determines whether the file type is a markup language document at step 86. If the file is not a markup language document, document interface 18 identifies a suitable application 16 associated with the file at step 88. After identifying the suitable application 16, document interface 18 forwards the file to the identified application 16 at step 90.

Returning to step 86, if document interface 18 determines that the file is a markup language document, document interface 18 determines whether the header of the file identifies multiple included files at step 92. If document interface 18 determines that the header does not identify multiple files, document interface 18 may extract electronic data in the file at step 94. Furthermore, document interface 18 may process the extracted data as appropriate at step 96.

Returning to step 92, if document interface 18 determines that the header does identify multiple files, document interface 18 identifies the type of an included file at step 98. Document interface 18 determines whether the included file is a markup language document at step 100. If the included file is a markup language document, document interface 18 extracts electronic data from the included file at step 102. Furthermore, document interface 18 processes the extracted data at step 104 before determining whether additional files are included in the received markup language document at step 106.

Returning to step 100, if document interface 18 determines that the included file is not a markup language document, document interface 18 identifies an application 16 associated with the included file at step 108. Document interface 18 forwards the included file to the identified application 16 at step 110 before determining whether the received markup language document includes additional files at step 106. If document interface 18 determines that the received markup language document includes additional files, method 80 returns to step 98. Alternatively, if document interface 18 determines that the markup language document does not include additional files, method 80 returns to step 82.

Thus, method 80 illustrates an example of receiving and processing markup language documents communicated through system 10. However, as with the previous flowchart, this flowchart illustrates only an exemplary method of operation, and system 10 contemplates document interface 18 using any suitable techniques, elements, and applications for performing similar tasks. Thus, many of the steps in this flowchart may take place simultaneously and/or in different orders than as shown. In addition, document interface 18 may use methods with additional steps, fewer steps, and/or different steps, so long as the methods remain appropriate.

Although the present invention has been described in several embodiments, a myriad of changes and modifications may be suggested to one skilled in the art. It is intended that the present invention encompass such changes and modifications as fall within the scope of the present appended claims.

What is claimed is:

1. A method for communicating multiple files in a single markup language document, comprising:
   receiving electronic data for delivery to a destination address;
   receiving an electronic file associated with the electronic data;
   generating a first markup language document including the electronic data;
   storing both the first markup language document and the electronic file in a payload of a second markup language document;
   generating a header for the second markup language document, the header identifying the existence of both the first markup language document and the electronic file in the payload, the header comprising at least one parameter indicative of one or more relationships between the first markup language document and the electronic file in the payload; and
   transmitting the second markup language document including the header and the payload to the destination address using a communication network.

2. The method of claim 1, further comprising:
   receiving a second electronic file associated with the electronic data;
   storing the second electronic file in the payload;
   modifying the header to identify the existence of the second electronic file in the payload; and
   transmitting the second markup language document including the modified header and the payload to the destination address using the communication network.

3. The method of claim 1, further comprising:
   generating a pointer for the first markup language document, the pointer identifying a key stored in the second markup language document;
   generating the key for the second markup language document, the key identifying data in the electronic file;
   storing the pointer in the first markup language document; and
   storing the key in the second markup language document.

4. The method of claim 1, further comprising:
   receiving a first inbound markup language document including an inbound header and an inbound payload;
   determining that the inbound header identifies both a second inbound markup language document and an inbound electronic file in the inbound payload;
   accessing the second inbound markup language document in the inbound payload; and
   accessing the inbound electronic file in the inbound payload.

5. The method of claim 4, further comprising:
   extracting inbound electronic data from the second inbound markup language document;
   identifying a first application for processing the inbound electronic data;
   transmitting the inbound electronic data to the first application for processing;
   identifying a second application for processing the inbound electronic file; and
   transmitting the inbound electronic file to the second application for processing.

6. The method of claim 1, wherein both the first markup language document and the second markup language document conform to a public standard for text-based markup language communications.

7. The method of claim 6, wherein the standard is an extensible markup language (XML) standard.

8. The method of claim 1, wherein the electronic file conforms to a public or private format for sharing information.

9. The method of claim 8, wherein the format is portable document format (PDF).

10. A device for communicating multiple files in a single markup language document, comprising:
    one or more processors for executing a document interface, the document interface operable to receive electronic data for delivery to a destination address, to receive an electronic file associated with the electronic data, to generate a first markup language document including the electronic data, to store both the first markup language document and the electronic file in a payload of a second markup language document, to generate a header for the second markup language document, the header identifying the existence of both the first markup language document and the electronic file in the payload, the header comprising at least one parameter indicative of one or more relationships between the first markup language document and the electronic file in the payload, and to transmit the second markup language document including the header and the payload to the destination address using a communication network.

11. The device of claim 10, the document interface further operable to receive a second electronic file associated with the electronic data, to store the second electronic file in the payload, to modify the header to identify the existence of the second electronic file in the payload, and to transmit the second markup language document including the modified header and the payload to the destination address using the communication network.

12. The device of claim 10, the document interface further operable to generate a pointer for the first markup language document, the pointer identifying a key stored in the second markup language document, to generate the key for the second markup language document, the key identifying data in the electronic file, to store the pointer in the first markup language document, and to store the key in the second markup language document.

13. The device of claim 10, the document interface further operable to receive a first inbound markup language document including an inbound header and an inbound payload, to determine that the inbound header identifies both a second inbound markup language document and an inbound electronic file in the inbound payload, to access the second inbound markup language document in the inbound payload, and to access the inbound electronic file in the inbound payload.

14. The device of claim 13, the document interface further operable to extract inbound electronic data from the second inbound markup language document, to identify a first application for processing the inbound electronic data, to transmit the inbound electronic data to the first application for processing, to identify a second application for processing the inbound electronic file, and to transmit the inbound electronic file to the second application for processing.

15. The device of claim 10, wherein both the first markup language document and the second markup language document conform to a public standard for text-based markup language communications.

16. The device of claim 15, wherein the standard is an extensible markup language (XML) standard.

17. The device of claim 10, wherein the electronic file conforms to a public or private format for sharing information.

18. The device of claim 17, wherein the format is portable document format (PDF).

19. A non-transitory computer readable medium encoding logic for communicating multiple files in a single markup language document, the logic operable when executed to:
receive electronic data for delivery to a destination address;
receive an electronic file associated with the electronic data;
generate a first markup language document including the electronic data;
store both the first markup language document and the electronic file in a payload of a second markup language document;
generate a header for the second markup language document, the header identifying the existence of both the first markup language document and the electronic file in the payload, the header comprising at least one parameter indicative of one or more relationships between the first markup language document and the electronic file in the payload; and
transmit the second markup language document including the header and the payload to the destination address using a communication network.

20. The non-transitory computer readable storage medium of claim 19, further operable when executed to:
receive a second electronic file associated with the electronic data;
store the second electronic file in the payload;
modify the header to identify the existence of the second electronic file in the payload; and
transmit the second markup language document including the modified header and the payload to the destination address using the communication network.

21. The non-transitory computer readable storage medium of claim 19, further operable when executed to:
generate a pointer for the first markup language document, the pointer identifying a key stored in the second markup language document;
generate the key for the second markup language document, the key identifying data in the electronic file;
store the pointer in the first markup language document; and
store the key in the second markup language document.

22. The non-transitory computer readable storage medium of claim 19 further operable when executed to:
receive a first inbound markup language document including an inbound header and an inbound payload;
determine that the inbound header identifies both a second inbound markup language document and an inbound electronic file in the inbound payload;
access the second inbound markup language document in the inbound payload; and
access the inbound electronic file in the inbound payload.

23. The non-transitory computer readable storage medium of claim 22, further operable when executed to:
extract inbound electronic data from the second inbound markup language document;
identify a first application for processing the inbound electronic data;
transmit the inbound electronic data to the first application for processing;
identify a second application for processing the inbound electronic file; and
transmit the inbound electronic file to the second application for processing.

24. The non-transitory computer readable storage medium of claim 19, wherein both the first markup language document and the second markup language document conform to a public standard for text-based markup language communications.

25. The non-transitory computer readable storage medium of claim 24, wherein the standard is an extensible markup language (XML) standard.

26. The non-transitory computer readable storage medium of claim 19, wherein the electronic file conforms to a public or private format for sharing information.

27. The non-transitory computer readable storage medium of claim 26, wherein the format is portable document format (PDF).

* * * * *